May 27, 1924.

S. T. COLT

DENTAL INSTRUMENT

Filed Oct. 26, 1923

1,495,675

Inventor:
SYDNA T. COLT.
By Hazard and Miller
Attorneys

Witness:

Patented May 27, 1924.

1,495,675

UNITED STATES PATENT OFFICE.

SYDNA T. COLT, OF LONG BEACH, CALIFORNIA.

DENTAL INSTRUMENT.

Application filed October 26, 1923. Serial No. 671,041.

*To all whom it may concern:*

Be it known that I, Mrs. SYDNA T. COLT, a citizen of the United States, residing at Long Beach, in the county of Los Angeles and State of California, have invented new and useful Improvements in Dental Instruments, of which the following is a specification.

This invention relates to dental instruments and more particularly to a mouth cleaning instrument.

It is an object of the present invention to provide a device of extreme simplicity, of sanitary form, of low cost, and which may be efficiently used for cleaning the tongue.

Another object is to provide a tongue cleaning instrument consisting of a handle member and a tongue scraper mounted in the handle so as to be concealed therein when out of use and adapted to be pulled into an extended position readily for use.

Other objects and advantages will be made manifest in the following specification of embodiments of the invention illustrated in the accompanying drawing, wherein.

Figure 5:
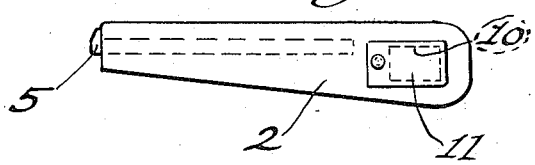
Figure 5 shows a slightly modified form.

The invention consists of a suitable body and handle forming part 2 which may comprise the handle of the tooth brush 3 as shown in Figs. 1 to 4, inclusive or it may consist of a simple body without a brush as in Fig. 5.

Figure 1:
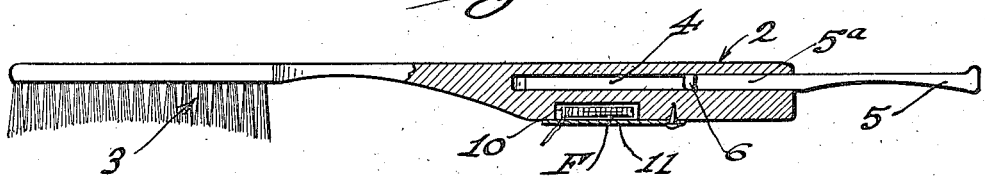
Figure 1 is a side elevation and sectional view of a form of the invention with the scraper extended.
Figure 2:
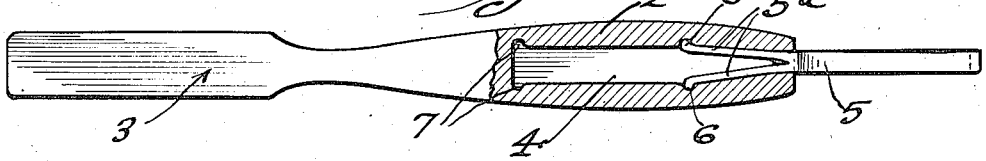
Figure 2 is a plan and section showing the scraper extended.
Figure 3:
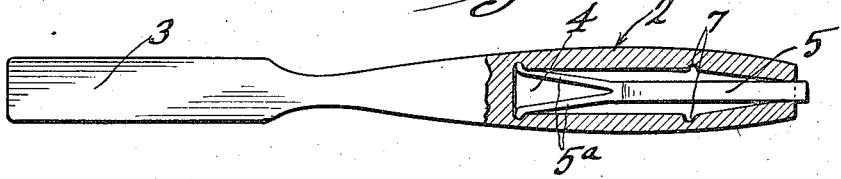
Figure 3 is a plan and section showing the scraper concealed in the handle.
Figure 4:
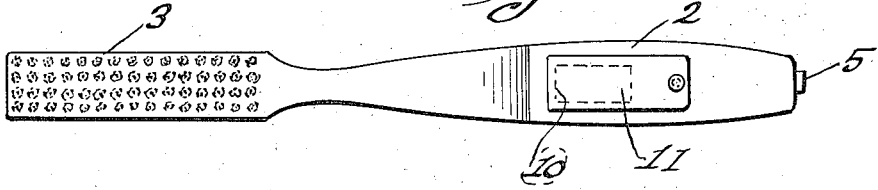
Figure 4 is a bottom view of the instrument.

This handle or body is provided with a chamber 4 of suitable dimensions and formed to receive a scraper blade or shank 5 which may be pushed into the chamber as in Fig. 3 or extended therefrom as in Fig. 2 so that the scraper 5 can be effectively applied to the tongue of a person and drawn down the tongue in an effective manner to clean or scrape the same. Means are provided to limit the outward movement of the scraper and as shown such means consists of flexible end portions 5ª of the shank 5. These are provided with out-turned lugs 6 to register with notches 7 provided along the side walls of the chamber 4 in which the scraper slides.

When desired the handle 4 may be provided with a pocket 10 having a movable cover 11 so that a spool or hank of dental floss F may be inserted in the pocket and drawn therefrom as needed.

Further embodiments, modifications and variations may be resorted to within the spirit of my invention.

What is claimed is:

1. In combination with a tooth brush having a solid handle with a longitudinal chamber extending from the end of the handle in the opposite direction from the brush, a tongue scraper operatively mounted in the chamber, said tongue scraper having flexible inner end portions with out turned lugs at their inner ends, said chamber having notches to be engaged by the lugs.

2. A solid handle body having a chamber extending from one end, said chamber forming notches at its inner end and near its outer end, and a tongue scraper comprising a bar and flexible prongs extending from the inner end of the bar and having out turned lugs to engage in the notches so that the scraper may be moved into the handle to engage the inner notches, and there being a projection of the outer end of the scraper to be engaged for pulling the scraper outwardly for use.

In testimony whereof I have signed my name to this specification.

SYDNA T. COLT.